US012354472B2

(12) United States Patent
Kirchner et al.

(10) Patent No.: US 12,354,472 B2
(45) Date of Patent: Jul. 8, 2025

(54) MONITORING SYSTEM

(71) Applicant: Transportation IP Holdings, LLC, Norwalk, CT (US)

(72) Inventors: Michael Kirchner, Jacksonville, FL (US); Larry Chalmers, Jacksonville, FL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 330 days.

(21) Appl. No.: 17/889,716

(22) Filed: Aug. 17, 2022

(65) Prior Publication Data

US 2023/0146176 A1 May 11, 2023

Related U.S. Application Data

(60) Provisional application No. 63/276,710, filed on Nov. 8, 2021.

(51) Int. Cl.
*G08G 1/01* (2006.01)
*G07C 5/02* (2006.01)
*G08G 1/02* (2006.01)

(52) U.S. Cl.
CPC ............. *G08G 1/0116* (2013.01); *G07C 5/02* (2013.01); *G08G 1/02* (2013.01)

(58) Field of Classification Search
CPC .... G08G 1/0116; G08G 1/0125; G08G 1/075; G08G 1/0145; G08G 1/02; G07C 5/02; G08B 7/06; G08B 29/04; G08B 21/02; G07B 15/063
See application file for complete search history.

(56) References Cited

U.S. PATENT DOCUMENTS

| | | | | |
|---|---|---|---|---|
| 6,198,993 B1 * | 3/2001 | Higashi | .................. | G08G 1/075 104/298 |
| 7,155,358 B2 * | 12/2006 | Bamfield | ................ | B61L 29/30 702/85 |
| 7,772,996 B2 * | 8/2010 | Burns | .................... | G08G 1/164 340/991 |
| 7,949,463 B2 * | 5/2011 | Ignatin | ............. | G08G 1/096805 340/995.13 |
| 8,630,757 B2 * | 1/2014 | Daum | ..................... | B61L 27/16 701/19 |
| 9,733,625 B2 * | 8/2017 | Kumar | ................ | B61L 15/0058 |
| 11,830,357 B1 * | 11/2023 | Murphy | ............... | G08G 1/0145 |
| 2002/0099481 A1 * | 7/2002 | Mori | ...................... | G05D 1/027 318/587 |

(Continued)

*Primary Examiner* — Frederick M Brushaber
(74) *Attorney, Agent, or Firm* — K&L Gates LLP

(57) ABSTRACT

A monitoring system and method may receive detection times at which passage of one or more vehicle systems by a detection device disposed along a route is detected. Locations of the one or more vehicle systems at different times may be received from one or more location sensors disposed onboard the one or more vehicle systems. The locations of the one or more vehicle systems when the one or more vehicle systems were detected by the detection device may be determined by comparing the detection times with the different times associated with the locations. A condition or state of the detection device can be determined by comparing the locations that are determined by the controller with a device location of the detection device.

20 Claims, 4 Drawing Sheets

(56) References Cited

U.S. PATENT DOCUMENTS

| | | | | |
|---|---|---|---|---|
| 2004/0249571 | A1* | 12/2004 | Blesener | B61L 29/28 340/907 |
| 2015/0073702 | A1* | 3/2015 | Jouaux | G01C 21/26 701/519 |
| 2015/0073703 | A1* | 3/2015 | Jouaux | G01S 5/0278 701/465 |
| 2020/0412813 | A1* | 12/2020 | Mong | B61L 27/10 |
| 2022/0058943 | A1* | 2/2022 | Jeong | H04B 17/104 |

* cited by examiner

MONITORING SYSTEM

CROSS-REFERENCE TO RELATED APPLICATIONS

This application claims priority to U.S. Provisional Application No. 63/276,710 (filed 8 Nov. 2021), the entire disclosure of which is incorporated herein by reference.

BACKGROUND

Technical Field

The subject matter described herein relates to systems and methods that monitor operation of detection systems used to detect movement of vehicles.

Discussion of Art

A variety of vehicles travel on routes that may cross or intersect each other, or otherwise be positioned, such that certain locations of the routes have an increased risk of collision between vehicles. One example of such a location is a crossing or intersection between routes, such as between a track of a rail vehicle and a road. But not all crossings or intersections are between different types of routes of different types of vehicles. The crossings and intersections described herein may be intersections between different types of routes traveled by different types of vehicles (e.g., rail vehicles traveling on tracks versus automobiles, buses, and trucks traveling on roads) or may be intersections between similar or same types of routes traveled by vehicles that travel on those routes (e.g., intersections between roads traveled by trucks, automobiles, motorcycles, etc.; intersections between paths in which mining vehicles move, etc.).

Some known detection systems use direct current (DC) circuits coupled with conductive portions of a route in locations on both sides of an intersection or crossing. As a pair of conductive wheels coupled by a conductive axle (e.g., a wheel-axle set) of a vehicle passes over the circuit, the wheels and axle form a short in the circuit, which is used to detect approach of the vehicle toward the intersection or the crossing. There may be a couple of these circuits on each side of the intersection, with the farthest circuits away from the intersection being referred to as an approach circuit and the circuits closer to the intersection being referred to as island circuits.

Some known crossing systems activate safety devices responsive to expiration of a delay after detection of the wheel-axle set at the detection circuit. For example, a gate may be lowered, lights may be activated, a horn may be activated, etc., after expiration of a ten second delay following detection of a vehicle approaching the crossing by a detection circuit. These known systems also may detect completion of a vehicle or multi-vehicle system moving through the crossing responsive to the island circuit detecting the last wheel-axle set of the vehicle or vehicle system. The safety devices may be deactivated following expiration of the same or another delay following detection of the last axle of the vehicle or vehicle system past the island circuit.

Some known detection circuits degrade over time and suffer from issues such as failing to detect the first axle of a vehicle approaching the crossing. The circuits may not detect the short until after the first wheel-axle set passes through or over the circuit. Instead, another wheel-axle set (e.g., the third, fifth, etc., wheel-axle set) may be detected. As a result, the safety devices may be activated too late (e.g., the vehicle may be within or too close to the crossing to provide adequate warning to others in the crossing to avoid a collision). Additionally, some types of vehicles may have wheel-axle sets that do not consistently or reliably provide a short in the detection circuit that can be detected by the detection circuit. As a result, these vehicles may not be detected by the circuits.

Detection circuits currently are monitored by performing periodic inspections of locations of vehicles when the detection circuits detect the vehicles. For example, known detection circuits are manually examined approximately once a month. But the detection circuits can significantly degrade between these inspections and performing inspections more often may be too time-consuming and/or too expensive.

Thus, a need exists for a monitoring system that can examine operation of detection circuits for crossing safety systems in a way that solves one or more of the problems set forth above.

BRIEF DESCRIPTION

In one example, a monitoring system includes a controller that may receive detection times at which passage of one or more vehicle systems by a detection device disposed along a route is detected. The controller may determine sensed locations of the one or more vehicle systems when the one or more vehicle systems were detected by the detection device. The controller may receive the sensed locations from one or more location sensors of the one or more vehicle systems. The controller may determine the sensed locations when the one or more vehicle systems were detected by determining the sensed locations received by the one or more location sensors at the detection times. The controller may identify a condition or state of the detection device by comparing the sensed locations determined by the controller at the detection times with a device location of the detection device.

In another example, a method (e.g., for monitoring operation of detection devices) includes determining times at which one or more vehicle systems are detected by a detection device disposed along a route, determining locations of the one or more vehicle systems at the times the detection device detected the one or more vehicle systems, and identifying a condition or state of the detection device by comparing the locations that are determined by the controller with a device location of the detection device.

In another example, a monitoring system includes a controller that may receive a detection time at which passage of one or more vehicle systems by a detection device disposed along a route is detected. The controller may determine a sensed location of the one or more vehicle systems when the one or more vehicle systems were detected by the detection device. The controller receives the sensed location from one or more location sensors at the detection time. The controller may compare the sensed location determined by the location sensor of the one or more vehicle systems at the detection time with a device location of the detection device. The controller may determine a difference between the sensed location and the device location If the difference between the sensed location and the device location may be greater than or equal to a threshold distance, the controller may identify a degraded state of the monitoring system. If the difference between the sensed location and the device location may be less than the threshold distance, the controller may identify a healthy state of the monitoring system

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to monitoring systems and methods that track operation in detection devices over time. The detection devices detect locations of vehicle systems as the vehicle systems approach features of interest in or along routes, such as crossings or intersections between routes. The monitoring systems and methods can track where the vehicle systems are located when the detection devices detect the vehicle systems to determine whether the detection devices are operating as expected (and detecting the vehicle systems as the vehicle systems first reach or pass through the detection devices) or are operating unexpectedly. A detection device may be operating unexpectedly when the vehicle system is not detected, or a significant portion of the vehicle system has passed over or through the detection device before the detection device detects the vehicle system. A significant portion of the vehicle system may pass over or through the detection device when the detection device misses one or more opportunities to detect the vehicle system while the vehicle system continues to move over, past, or through the detection device.

The monitoring systems and methods can receive times at which the detection devices detect vehicle systems and the locations of the vehicle systems at the same times. The times at which the detection devices detect the vehicle systems can be reported to the monitoring system and method by the detection devices, and the locations of the vehicle systems at these times can be reported by location sensors onboard the vehicle systems, such as global navigation satellite system (GNSS) receivers (e.g., global positioning system, or GPS, receivers). If the locations of the vehicle systems are at or within a threshold distance of the detection devices when the detection devices detect the vehicle systems, then the monitoring systems and methods can determine that the detection devices are operating as expected. But if the locations of the vehicle systems are farther than a threshold distance downstream from the detection device (e.g., along a direction of movement of the vehicle system or in locations that are between the detection device and the crossing) when the detection device identifies the vehicle system, then the monitoring systems and methods may determine that the detection device is not operating as expected. The monitoring system and method can implement one or more responsive actions, such as by directing maintenance personnel to travel to the detection device to inspect, repair, or replace the detection device; changing operation of the detection device (e.g., increasing a sensitivity of the detection device to vehicle systems); or the like.

Figure 1:
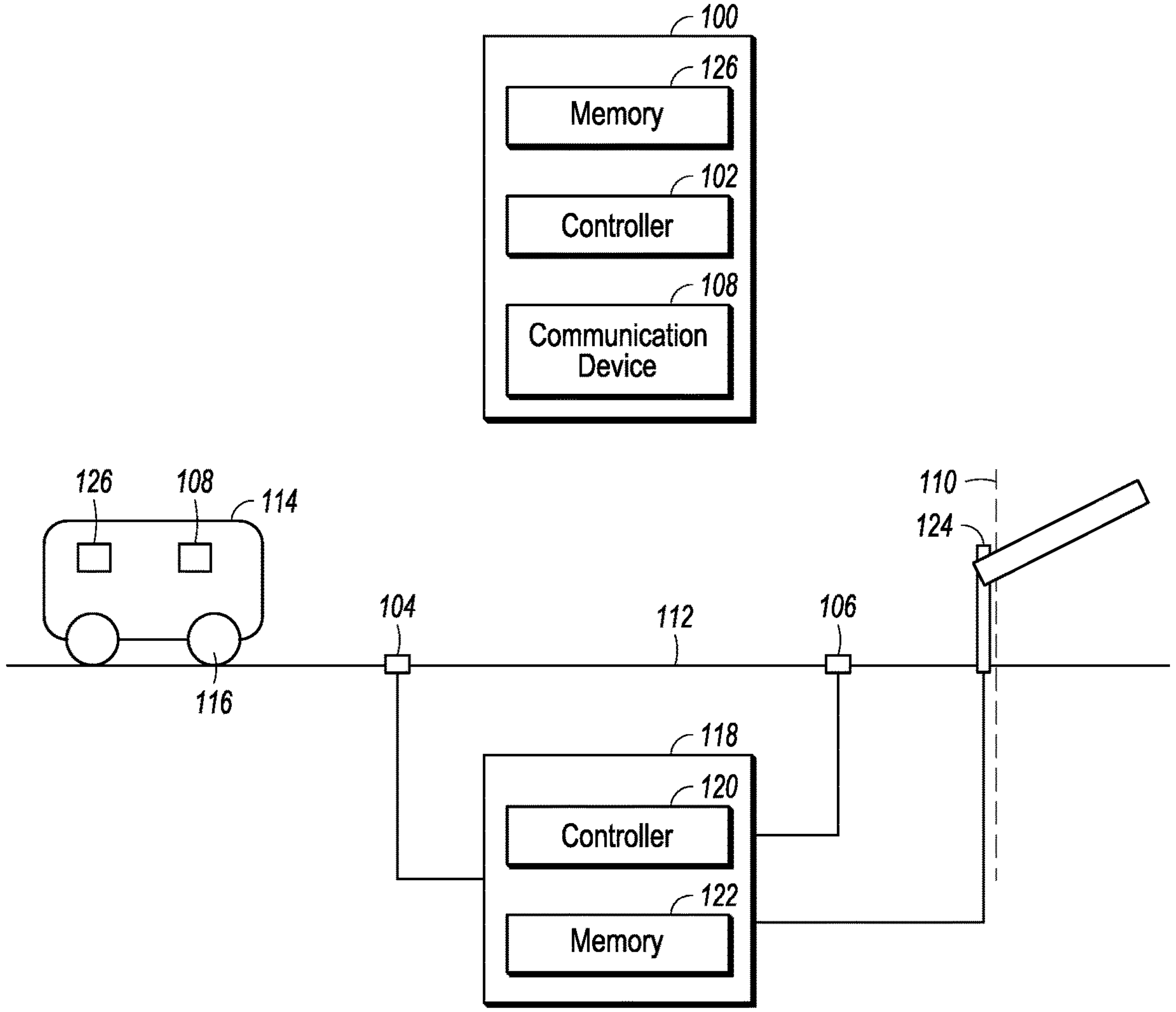
FIG. 1 illustrates one example of a monitoring system.

FIG. 1 illustrates one example of a monitoring system 100. The monitoring system includes a controller 102 that represents hardware circuitry that includes and/or is connected with one or more processors (e.g., one or more microprocessors, integrated circuits, field programmable gate arrays, etc.) that perform the operations described herein in connection with the controller. The controller communicates with detection devices 104, 106 via a communication device 108, which can represent transceiving circuitry (e.g., one or more antennas, modems, transceivers, receivers, or the like). The detection devices can include an upstream or farther detection device 104 and a downstream or closer detection device 106. The upstream detection device can be farther from a location of interest 110 along a route 112, such as a crossing or intersection between the route and another route, than the downstream detection device. Optionally, the upstream detection device can be referred to as an approach shunt or an approach circuit and the downstream detection device can be referred to as an island shunt or an island circuit.

The detection devices can detect passage of vehicle systems 114 as the vehicle systems move over, by, through, or past the detection devices. In one example, the detection devices can include electronic circuits that apply a DC voltage or other electric energy across parallel conductive rails of the route. As a wheel-axle set 116 of the vehicle system moves over the detection device, the wheel-axle set provides a conductive pathway from one conductive rail to the other (e.g., from one conductive wheel that contacts one conductive rail, through the axle, and through the other conductive wheel to the other conductive rail). This conductive pathway forms a short in the circuit of the detection device. The detection device can include one or more processors that detect the vehicle system upon identifying this short. Alternatively, the detection device may additionally or alternatively include a camera, accelerometer, pressure sensor, light sensor, etc. that detects the vehicle system. For example, a camera may optically detect the vehicle system, the accelerometer may sense vibrations created by movement of the vehicle system, the pressure sensor may detect the change in pressure or weight created by the movement of the vehicle system, the light sensor may sense changes in light (visible or outside of the visible spectrum) caused by passage of the vehicle system, or the like.

The detection devices can send signals to a wayside control center 118 that can record when the vehicle systems are detected by the detection devices. The control center can represent a building or other structure near the location of interest along the route, such as a gate house, crossing shed, or the like. The control center can house one or more processors (e.g., a controller 120) that receive the signals from the detection devices, and that may record the times at which the signals are received in a tangible and non-transitory computer readable storage medium, or computer memory 122. The control center controller also can be connected (e.g., via conductive pathways, such as wires, cables, or the like; or via wireless connections) with one or more safety devices 124. The safety devices can represent moveable gates, lights, horns, or the like. The control center controller can direct the safety device to activate and close or lower the gate, activate the lights, and/or activate the horn responsive to the upstream detection devices detecting passage of the vehicle system. For example, the control center controller can send a signal to the safety device after (a) receiving a signal from the detection device 104 and (b) after expiration of a predetermined or designated period of time (e.g., ten seconds). The control center controller can direct the safety device to remain activated until another event is detected, such as detection of the last wheel-axle set of the vehicle system by the downstream detection device. The control center controller can then direct the safety device to deactivate (or deactivate following expiration of another period of time following detection of the vehicle system by the downstream detection device).

The vehicle system can be a single or multi-vehicle system. The vehicle system may be a rail vehicle system formed from one or more rail vehicles (e.g., locomotives, rail cars, transit vehicles, etc.), or can be another type of vehicle system formed from one or more automobiles, trucks, buses, agricultural vehicles, mining vehicles, or the like). The vehicles in the multi-vehicle system may be mechanically coupled with each other or may be separate from each other but coordinate movements of each other so that the vehicles move together as the vehicle system (e.g., as a convoy, fleet, or swarm).

The vehicle system may include an onboard location sensor 126. The location sensor may output data signals indicative of the locations of the vehicle system. The location sensor may be a GNSS receiver (e.g., a GPS receiver), a dead reckoning system, a wireless triangulation system, or the like. The vehicle system may include a communication device 108 similar or identical to the communication device described above. This communication device can communicate locations of the vehicle system to another location, such as the monitoring system controller. In one embodiment, the location sensor and/or the communication device can be onboard components (or parts of onboard components) of a vehicle control system, such as a positive vehicle control system or a negative vehicle control system. These types of control systems may include an off-board system, such as a back-office system, which monitors locations of several vehicle systems, the statuses of routes, etc. and may communicate signals to the onboard components of vehicle systems to notify the vehicle systems whether the vehicle systems can or cannot enter different segments of the routes. For example, the positive vehicle control system can send signals to the vehicle systems notifying the vehicle systems whether the vehicle systems can enter an upcoming route segment (e.g., when the segment is unoccupied), can travel up to a designated speed limit, or the like. If the onboard components of the vehicle system do not receive a signal indicating that the vehicle system can travel into a route segment or up to a designated speed, then the onboard components can prevent movement of the vehicle system into the route segment, can prevent the vehicle system from moving faster than the designated speed limit, or the like. One example of a positive vehicle control system is a positive train control (PTC) system. With a negative vehicle control system, if the onboard components of the vehicle system do not receive a signal indicating that the vehicle system can travel into a route segment or up to a designated speed, then the onboard components can allow movement of the vehicle system into the route segment, allows the vehicle system to move faster than the designated speed limit, or the like. But receipt of a signal from the negative vehicle control system can prevent the onboard components from allowing the vehicle system from entering the route segment, moving faster than the speed limit, or the like.

In operation, the wayside or control center controller can record (e.g., store in the memory of the control center) the times at which the detection devices detect the vehicle system. The off-board controller 102 can obtain these times from the memory of the control center on a periodic, on-demand, irregular, or other basis. For example, the control center controller can communicate the times to the off-board controller, or the times can be downloaded to the off-board controller daily.

The off-board controller also can receive the locations of the vehicle systems as sensed by the location sensors. The controllers onboard the vehicle systems can send the locations to the off-board controller with times at which the locations were sensed. For example, a log of locations measured by the location sensor, along with the times at which the locations were sensed, can be sent to the off-board controller as the locations are sensed or on a periodic, on-demand, irregular, or other basis. If the vehicle system has onboard components of a positive or negative vehicle control system, then these onboard components may repeatedly determine and report the locations of the vehicle system to the off-board components of the positive or negative vehicle control system, which may include or be represented by the monitoring system. The off-board controller can record or otherwise store these locations in a tangible and non-transitory computer readable storage medium, such as another computer memory 126 of the monitoring system.

The off-board controller can use the reported locations of the vehicle system and the times at which the detection devices detected the vehicle system to evaluate and/or quantify the health or states of the detection devices. For example, the off-board controller can compare the time at which a detection device detected the vehicle system with the location of the vehicle system at that time (as sensed by the location sensor). If the location sensor did not sense the location of the vehicle system at the exact same time as when the detection device detected the vehicle system, then the off-board controller can extrapolate the location of the vehicle system at the time the detection device sensed the vehicle system or can use the location of the vehicle system that was measured at the closest time to the time at which the detection device sensed the vehicle system. For example, the off-board controller can use the location of the vehicle system that was sensed at a different time than when the detection device detected the vehicle system, but at a time that is closer than other locations.

The off-board controller can examine the locations of the vehicle system when the detection device detected the vehicle system to determine the health or state of the detection device. For example, if the location of the vehicle system when the detection device senses the vehicle system is such that the first or leading wheel-axle set of the vehicle system is at the detection device, then the detection device may be operating as expected or normally and have a good or expected state of health. But if the location of the vehicle system when the detection device senses the vehicle system is such that the first or leading wheel-axle set of the vehicle system is far from the detection device, then the detection device may be operating unexpectedly or abnormally and have a poor or unexpected state of health. In one example, the controller may learn from and make decisions on a set of data (including data provided by the detection device and the various location sensors), by making data-driven predictions and adapting according to the set of data. The controller may use machine learning to enable derivation-based learning outcomes based on the set of data. Machine learning may involve performing a plurality of machine learning tasks by machine learning systems, such as supervised learning, unsupervised learning, and reinforcement learning.

Figure 2:
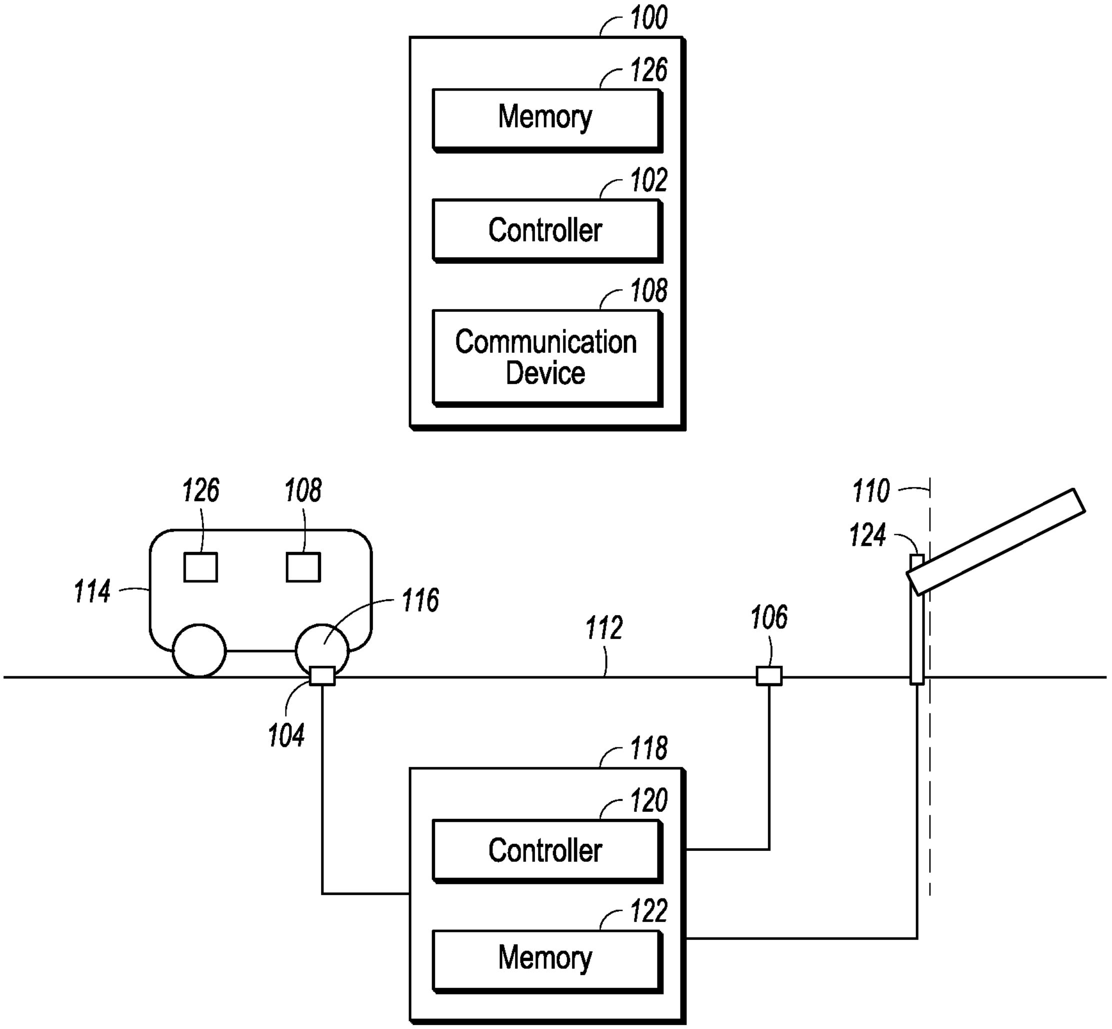
FIG. 2 illustrates one example of operation of the monitoring system shown in FIG. 1.

FIG. 2 illustrates one example of operation of the monitoring system shown in FIG. 1. In this illustration, the vehicle system is in the location when the upstream detection device detects the vehicle system. For example, the detection device may be operating as expected and detect the first or leading wheel-axle set of the vehicle system. The time shown in FIG. 2 can be recorded by the control center controller in the memory 122 and provided to the monitoring system. The off-board controller can receive the locations of the vehicle system as measured by the location sensor and the times at which those locations were measured from the vehicle system. The off-board controller can compare the location of the vehicle system sensed by the location sensor at the time when the detection device sensed the vehicle system with a known location of the detection device. If these two locations are similar (e.g., within a threshold distance of each other), then the off-board controller can determine that the detection device is operating as expected and/or is in a healthy state. But if the locations are not similar (e.g., the locations are not within the threshold distance of each other), then the off-board controller can determine that the detection device is operating unexpectedly, in a degraded state, and/or is not in a healthy state.

Additionally, the detection device may be operating unexpectedly when a significant portion of the vehicle system has passed over or through the detection device before the detection device detects the vehicle system. In one example, a significant portion may be over 15% of the overall length of the vehicle system, over 25% of the overall length of the vehicle system, or over 50% of the overall length of the vehicle system. The percentage of the overall length that may be considered a significant portion may vary based on operational characteristics or environmental characteristics, such as vehicle speed, vehicle weight, weather, location, population density along the route, among other factors. For example, where the vehicle speed may be relatively high, a significant portion may be a greater overall percentage of the length of the vehicle system (e.g., 50% or more). Where the population density along the route may be greater, a significant portion may be a smaller overall percentage of the length of the vehicle system (e.g., between 10-15%). In another example, a significant portion may be a particular vehicle of the vehicle system, for example a lead vehicle.

Figure 3:
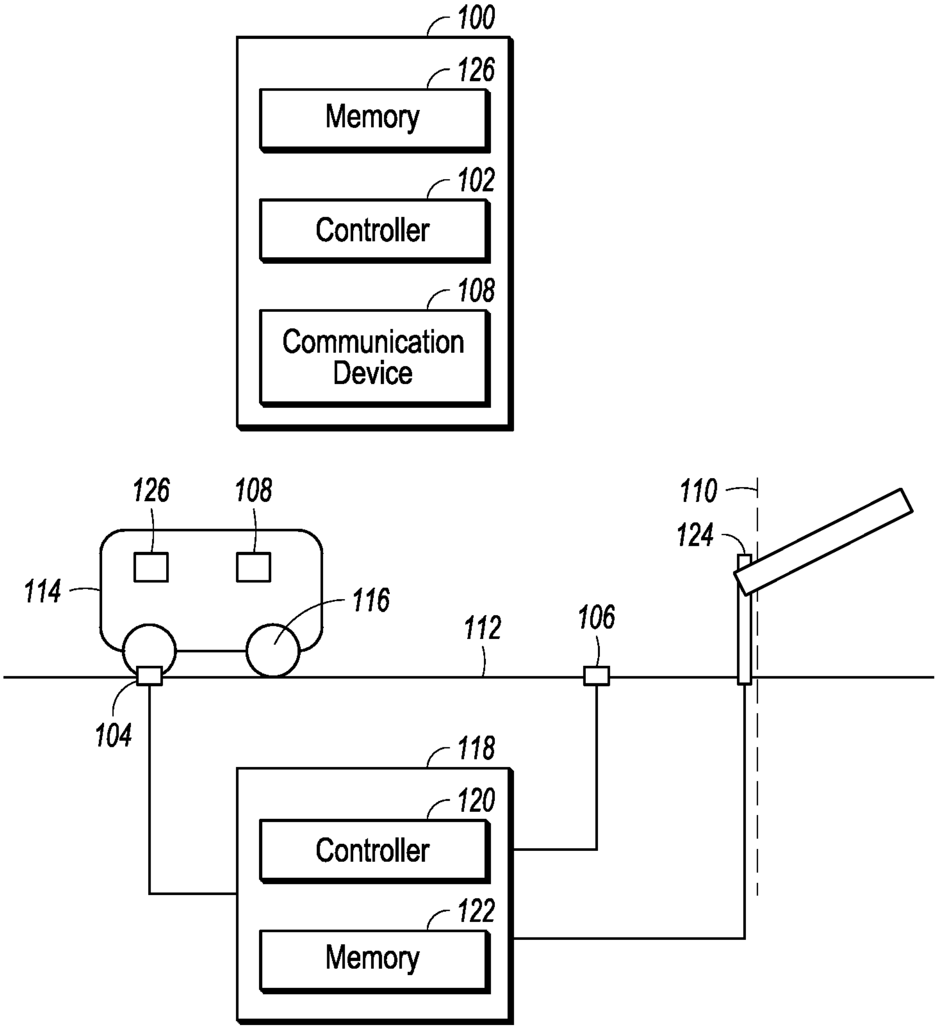
FIG. 3 illustrates another example of operation of the monitoring system shown in FIG. 1.

FIG. 3 illustrates another example of operation of the monitoring system shown in FIG. 1. In this illustration, the vehicle system is in the location when the upstream detection device detects the vehicle system, but only after the upstream detection device missed the first or leading wheel-axle set. For example, the detection device may not detect the first or leading wheel-axle set of the vehicle system, but may detect another (e.g., second, third, fourth, or the like, wheel-axle set) of the wheel-axle sets. This may be due to the first wheel-axle set not creating the short in the detection circuit, a fault in the detection device, or another issue with the detection device.

The off-board controller can track changes in the locations of the same or different vehicle systems when the detection device senses the vehicle system(s) over time to evaluate the state of the detection device. If the locations of the vehicle systems upon detection by the detection device remain within a threshold distance of each other and/or the location of the detection device, the off-board controller can determine that the detection device is operating as expected. But if the locations drift or change over time (e.g., are no longer within the threshold distance of each other and/or the location of the detection device), then the off-board controller can determine that the detection device is not operating as expected. The off-board controller can then direct maintenance personnel to inspect, repair, and/or replace the detection device. In one embodiment, the off-board controller may determine that the locations of a given vehicle system at the detection device may be starting to drift or change over time, however the drift or change may be within the threshold distance. The off-board controller may send an alert to inspect the given vehicle system and/or detection device, as the drift or change may be indicative of a potential issue with either the given vehicle system or the detection device. By tracking the locations of the same vehicle systems over time, the monitoring system may be able to identify trends or patterns that may allow for repair or replacement of components before failure.

Some vehicle systems may have wheel-axle sets that do not reliably create the short needed by some detection devices to detect the vehicle system. For example, due to the structural design, materials, and/or the like, of the wheel-axle sets of some vehicle systems, the leading or first wheel-axle set may not create the short used by the detection device to detect the wheel-axle set. As a result, the detection device may miss one or more vehicle systems passing through the detection device. The off-board controller can track locations of the vehicle systems and determine that the vehicle systems moved through the detection device(s) without being detected. The off-board controller can monitor which vehicle systems have the wheel-axle sets that are not detected by the detection devices and direct one or more responsive actions, such as repair, inspection, maintenance, or modification of the vehicle system. For example, the leading wheel-axle set of such a vehicle system may be repaired or modified to ensure that the wheel-axle set can create the short detected by the detection device. In one example, the off-board controller may track the locations of a first vehicle system across multiple detection devices (e.g., the upstream detection device and the downstream detection device). For example, the off-board controller may track the locations of the first vehicle system through two or more consecutive detection devices. The off-board controller may then track the locations of a second vehicle system (independent of the first vehicle system) across the same detection devices as the first vehicle system. The off-board controller may then compare the detection of the first vehicle system and the second vehicle system. This may provide additional information as to whether a detection error is the result of the vehicle system or the detection device. For example, if the wheel-axle sets of the first vehicle system are not detected by the detection device but the wheel-axle sets of the second vehicle system are detected by the detection device, it may be more likely that the issue may be with the first vehicle system. However, if the wheel-axle sets of the first vehicle system are not detected by the detection device and the wheel-axle sets of the second vehicle system are also not detected by the detection device, it may be more likely that the issue may be with the detection device rather than with the first or second vehicle systems. Additionally, this may help isolate a particular wheel-axle set of a particular vehicle as needing inspection or repair if the remaining wheel-axle sets on the particular vehicle or other vehicles are returning normal detection readings from the detection device. While the description above compares locations of when the vehicle system is detected by the upstream detection device, optionally, the subject matter may be used with the downstream detection device. In one example, readings from the upstream detection device may be compared with readings from the downstream detection device. This may allow the off-board controller to further triangulate the locations of the vehicle systems and diagnosis or evaluate the condition or state of the upstream detection device and the downstream detection device, respectively. By using both the upstream and downstream detection devices, the controller may have more data points to determine the location of the vehicle systems and evaluate the operation of the detection devices.

Figure 4:
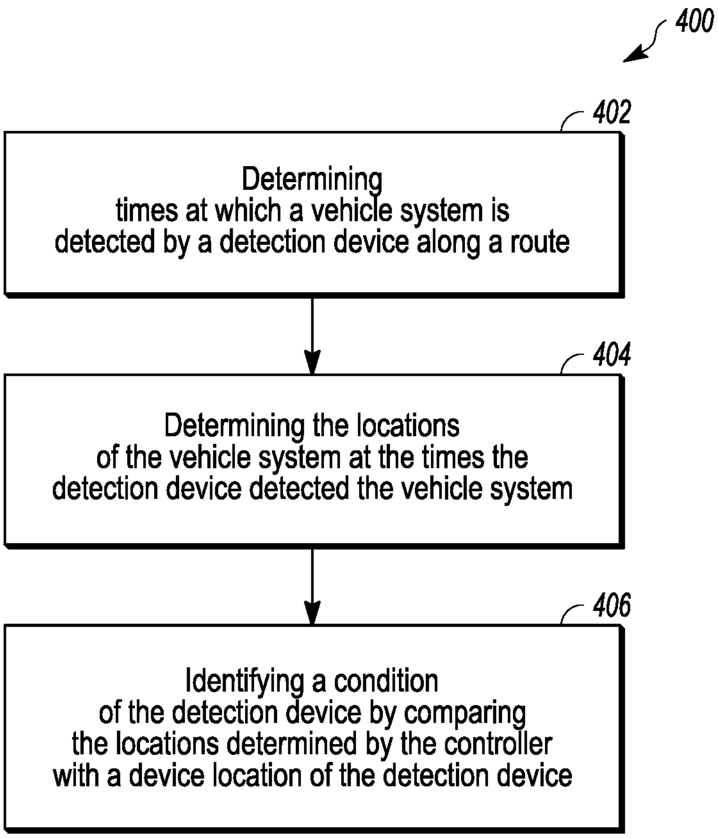
FIG. 4 illustrates one example of a method for monitoring operation of a detection device.

FIG. 4 illustrates an example of a method for monitoring operation of a detection device 400. At step 402, the method can include determining times at which one or more vehicle systems are detected by the detection device. The detection devices may be disposed along the route. These times can be determined by receiving or otherwise accessing a log of times at which the detection device identified passage of a vehicle system. At step 404, the method may include determining locations of one or more of the vehicle systems at the times the detection device detected the vehicle systems. These locations can be determined from onboard components of a positive or negative vehicle control system or can be obtained from location sensors of the vehicle systems. The location sensors may be positioned onboard the vehicle system, such as a GNSS receiver, a GPS receiver, a dead reckoning system, a wireless triangulation system, or the like. At step 406, the method may include determining the locations of the vehicle systems at the times at which the detection devices sensed the vehicle systems and comparing these locations with the location of the detection device. If the locations of the vehicle systems differ from the location of the detection device, then this can indicate that the detection device may not be operating as expected or that the detection device is unable to detect one or more of the vehicle systems. As a result, the method can include determining that the detection device needs repair, inspection, or replacement and then repairing, inspecting, or replacing the detection device. If the locations of the vehicle systems do not differ from the location of the detection device, then this can indicate that the detection device may be operating as expected. The method can then terminate or return to one or more prior operations.

In one example, a monitoring system includes a controller that may receive detection times at which passage of one or more vehicle systems by a detection device disposed along a route is detected. The controller may receive locations of the one or more vehicle systems at different times from one or more location sensors disposed onboard the one or more vehicle systems. The controller may determine the locations of the one or more vehicle systems when the one or more vehicle systems were detected by the detection device by comparing the detection times with the different times associated with the locations. The controller may identify a condition or state of the detection device by comparing the locations that are determined by the controller with a device location of the detection device.

The detection device may be disposed ahead of a crossing between the route and another route. The detection device may detect the one or more vehicle systems to actuate a safety device at the crossing. The detection device may detect the one or more vehicle systems using an electric short provided by wheel-axle sets of the one or more vehicle systems. The controller may identify the one or more vehicle systems as not providing the electric short by comparing the locations that are determined by the controller with a device location of the detection device.

In another example, a method (e.g., for monitoring operation of detection devices) includes determining times at which one or more vehicle systems are detected by a detection device disposed along a route, determining locations of the one or more vehicle systems at the times the detection device detected the one or more vehicle systems, and identifying a condition or state of the detection device by comparing the locations that are determined by the controller with a device location of the detection device.

The detection device may be disposed ahead of a crossing between the route and another route. The detection device may detect the one or more vehicle systems to actuate a safety device at the crossing. The detection device may detect the one or more vehicle systems using an electric short provided by wheel-axle sets of the one or more vehicle systems.

In one embodiment, the monitoring system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the monitoring system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. A monitoring system comprising:

a controller configured to receive detection times at which passage of one or more vehicle systems by a detection device disposed along a route is detected, the controller also configured to determine sensed locations of the one or more vehicle systems when the one or more vehicle systems were detected by the detection device, the controller configured to receive the sensed locations from one or more location sensors of the one or more vehicle systems, the controller configured to determine the sensed locations when the one or more vehicle systems were detected by determining the sensed locations received by the one or more location sensors at the detection times, the controller configured to identify a condition or state of the detection device by comparing the sensed locations determined by the controller at the detection times with a device location of the detection device.

2. The monitoring system of claim 1, wherein the detection device is disposed before an intersection between the route and another route along a direction of travel of at least one of the one or more vehicle systems, the controller configured to determine the one or more vehicle systems approaching the intersection and to actuate a safety device at the intersection.

3. The monitoring system of claim 1, wherein the detection device is configured to detect the one or more vehicle systems using an electric short at least partially formed by a wheel-axle set of at least one of the one or more vehicle systems, wherein the controller is configured to identify the one or more vehicle systems as not forming the electric short by comparing the locations that are determined by the controller with the device location of the detection device.

4. The monitoring system of claim 3, wherein the controller is configured to direct responsive actions when the one or more vehicle systems are not providing the electric short.

5. The monitoring system of claim 1, wherein the controller is off-board the one or more vehicle systems.

6. The monitoring system of claim 1, wherein the controller is configured to determine the detection device is in an operable state when the locations determined by the controller at the detection times and the device location of the detection device are within a threshold distance.

7. The monitoring system of claim 1, wherein the controller is configured to determine the detection device is in a degraded state when the locations determined by the controller at the detection times and the device location of the detection device are within a threshold distance.

8. A method comprising:

determining times at which one or more vehicle systems are detected by a detection device disposed along a route;

determining locations of the one or more vehicle systems at the times the detection device detected the one or more vehicle systems; and identifying a condition or state of the detection device by comparing the locations that are determined by a controller at the determined times with a device location of the detection device.

9. The method of claim 8, further comprising the detection device detecting the one or more vehicle systems before an intersection between the route and another route along a direction of travel of at least one of the one or more vehicle systems and actuating a safety device at the intersection.

10. The method of claim 9, wherein the safety device is one or more of: movable gates, visual alarms, or audible alarms.

11. The method of claim 8, further comprising the detection device detecting the one or more vehicle systems using an electric short provided by a wheel-axle set of the one or more vehicle systems.

12. The method of claim 8, further comprising receiving the location of the one or more vehicle systems from a position sensor.

13. The method of claim 8, further comprising receiving the location of the one or more vehicle systems from a positive train control (PTC) system.

14. A monitoring system comprising:

a controller configured to receive a detection time at which passage of one or more vehicle systems by a detection device disposed along a route is detected, the controller also configured to determine a sensed location of the one or more vehicle systems when the one or more vehicle systems were detected by the detection device, the controller configured to receive the sensed location from one or more location sensors of the one or more vehicle systems at the detection time, the controller configured to compare the sensed location determined by the location sensor of the one or more vehicle systems at the detection time with a device location of the detection device and determine a difference between the sensed location and the device location, wherein if the difference between the sensed location and the device location is greater than or equal to a threshold distance, the controller is configured to identify a degraded state of the monitoring system and if the difference between the sensed location and the device location is less than the threshold distance, the controller is configured to identify an operable state of the monitoring system.

15. The monitoring system of claim 14, wherein the detection device is disposed before an intersection between the route and another route along a direction of travel of at least one of the one or more vehicle systems, the controller configured to determine the one or more vehicle systems approaching the intersection and to actuate a safety device at the intersection.

16. The monitoring system of claim 14, wherein the detection device is configured to detect the one or more vehicle systems using an electric short provided by wheel-axle sets of the one or more vehicle systems, wherein the controller is configured to identify the one or more vehicle systems as not providing the electric short by comparing the location received by the one or more location sensors at the detection time with a device location of the detection device.

17. The monitoring system of claim 16, wherein the controller is configured to direct responsive actions when the one or more vehicle systems are not providing the electric short.

18. The monitoring system of claim 14, wherein the controller is configured to receive a first sensed location from a first vehicle of the one or more vehicle systems at a first detection time and a second sensed location from a second vehicle of the one or more vehicle systems at a second detection time, wherein the controller configured to compare a first difference between the first sensed location and the device location with a second difference between the second sensed location and the device location, the controller configured to identify send an alert where the first difference and the second difference are not equal.

19. The monitoring system of claim 14, wherein the controller is off-board the one or more vehicle systems.

20. The monitoring system of claim 14, wherein the controller is configured to direct responsive actions when the monitoring system is in the degraded state.

* * * * *